US011416776B2

(12) United States Patent
Neumann

(10) Patent No.: US 11,416,776 B2
(45) Date of Patent: Aug. 16, 2022

(54) METHOD OF AND SYSTEM FOR IDENTIFYING AND ENUMERATING CROSS-BODY DEGRADATIONS

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC., Lakewood, CO (US)

(*) Notice: Subject to any disclaimer, the term of this patent is extended or adjusted under 35 U.S.C. 154(b) by 0 days.

(21) Appl. No.: 17/000,973

(22) Filed: Aug. 24, 2020

(65) Prior Publication Data

US 2022/0058520 A1    Feb. 24, 2022

(51) Int. Cl.
*G06N 20/00* (2019.01)
*G06N 5/02* (2006.01)

(52) U.S. Cl.
CPC ............ *G06N 20/00* (2019.01); *G06N 5/02* (2013.01)

(58) Field of Classification Search
CPC .................................. G06N 20/00; G06N 5/04
See application file for complete search history.

(56) References Cited

U.S. PATENT DOCUMENTS

| 6,692,916 | B2 | 2/2004 | Bevilacqua et al. |
| 7,761,309 | B2 | 7/2010 | Sacco et al. |
| 7,853,626 | B2 | 12/2010 | Jung et al. |
| 7,953,613 | B2 | 5/2011 | Gizewski |
| 8,388,530 | B2 | 3/2013 | Shusterman |
| 9,492,114 | B2 | 11/2016 | Reiman |
| 10,085,643 | B2 | 10/2018 | Bandic et al. |

(Continued)

OTHER PUBLICATIONS

Nashif, Shadman, et al. "Heart disease detection by using machine learning algorithms and a real-time cardiovascular health monitoring system." World Journal of Engineering and Technology 6.4 (2018): 854-873. (Year: 2018).*

(Continued)

*Primary Examiner* — Kevin W Figueroa
(74) *Attorney, Agent, or Firm* — Caldwell Intellectual Property Law; Katherine Rubino

(57) ABSTRACT

A system for identifying and enumerating cross-body degradations, the system comprising a computing device, wherein the computing device is configured to receive biological extraction data. Computing device may generate a first body degradation function, using a machine-learning model trained with data that correlates biological extraction data with rates of biological degradation of the body. Computing device may determine, using a machine-learning process and the first body degradation function, a second body degradation function, wherein the second body degradation function describes a rate of biological degradation that is statistically associated with a first body degradation function. Computing device identify, using the first body degradation function and the second body degradation function, a predictive relationship between the first body degradation function and the second body degradation function according to the biological extraction datum. Computing device may generate a body degradation packet and may provide to a user, the body degradation packet.

21 Claims, 8 Drawing Sheets

(56) References Cited

U.S. PATENT DOCUMENTS

| | | | |
|---|---|---|---|
| 2015/0211068 A1* | 7/2015 | Beim | C12Q 1/6883 800/3 |
| 2016/0091499 A1* | 3/2016 | Sterling | G16H 50/20 506/9 |
| 2017/0262604 A1* | 9/2017 | Francois | G16H 50/20 |
| 2018/0284141 A1 | 10/2018 | Ayton et al. | |
| 2019/0027249 A1 | 1/2019 | Fuksenko et al. | |

OTHER PUBLICATIONS

Daly, Robin M., et al. "Gender specific age-related changes in bone density, muscle strength and functional performance in the elderly: a-10 year prospective population-based study." BMC geriatrics 13.1 (2013): 1-9. (Year: 2013).*
https://diginole.lib.fsu.edu/islandora/object/fsu%3A507684/datastream/PDF/view.

* cited by examiner

METHOD OF AND SYSTEM FOR IDENTIFYING AND ENUMERATING CROSS-BODY DEGRADATIONS

FIELD OF THE INVENTION

The present invention generally relates to the field of machine-learning. In particular, the present invention is directed to a system for identifying and enumerating cross-body degradations.

BACKGROUND

Efficient systems for tracking age-related biological degradations suffer from difficulties in adequately sampling the breadth of physiological parameters that relate to degradation over the lifetime of the user. Furthermore systems encounter difficulty in efficiently and properly identifying the ways in which degradations occur, capturing the amounts of degradation and rates of degradation, and predicting degradation trajectories from these confounding variables.

SUMMARY OF THE DISCLOSURE

In an aspect, a system for identifying and enumerating cross-body degradations, the system comprising a computing device, wherein the computing device is designed and configured to receive a biological extraction pertaining to a user generate a first body degradation function, wherein generating the first body degradation datum further comprises training a body degradation machine-learning model using training data that correlates biological extraction data with rates of biological degradation of the body, and generating the first body degradation function as a function of the body degradation machine-learning model and the biological extraction, determine, using a degradation mapping statistical machine-learning process and the first body degradation function, a second body degradation function, wherein the second body degradation function describes a rate of biological degradation that is statistically associated with a first body degradation function, identify, using the first body degradation function and the second body degradation function, a predictive relationship between the first body degradation function and the second body degradation function according to the biological extraction datum, generate a body degradation packet, wherein the body degradation packet describes the first body degradation function and the second body degradation function, and provide to a user, the body degradation relationship packet.

In another aspect, a method for identifying and enumerating cross-body degradations, the system comprising a computing device, wherein the computing device is designed and configured to receive a biological extraction pertaining to a user generate a first body degradation function, wherein generating the first body degradation datum further comprises training a body degradation machine-learning model using training data that correlates biological extraction data with rates of biological degradation of the body, and generating the first body degradation function as a function of the body degradation machine-learning model and the biological extraction, determine, using a degradation mapping statistical machine-learning process and the first body degradation function, a second body degradation function, wherein the second body degradation function describes a rate of biological degradation that is statistically associated with a first body degradation function, identify, using the first body degradation function and the second body degradation function, a predictive relationship between the first body degradation function and the second body degradation function according to the biological extraction datum, generate a body degradation packet, wherein the body degradation packet describes the first body degradation function and the second body degradation function, and provide to a user, the body degradation relationship packet.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, the disclosure herein is directed to a method of and system for identifying and enumerating cross-body degradations. In an embodiment, the system comprising a computing device, wherein the computing device is designed and configured to receive biological extraction data pertaining to a user. The computing device may train a machine-learning model with the biological extraction data, including data relating biological extraction data to body degradations, to generate at least a mathematical function describing the physiological deterioration of a user over their lifetime. Computing device may determine a second degradation function from a first, using a statistical machine-learning process, wherein the second body degradation function describes a rate of biological degradation that is statistically associated with a first body degradation function. Using a statistical machine-learning process allows the system to generate biological degradation functions based on relationships that may not have been apparent. The computing device identify, using the body degradation functions, a predictive relationship between the first and the second degradation function. This predictive relationship may be extrapolated to future biological extraction data and future physiological deterioration the user may experience. Computing device may generate a body degradation packet, making the findings of the system accessible to the user.

Figure 1:
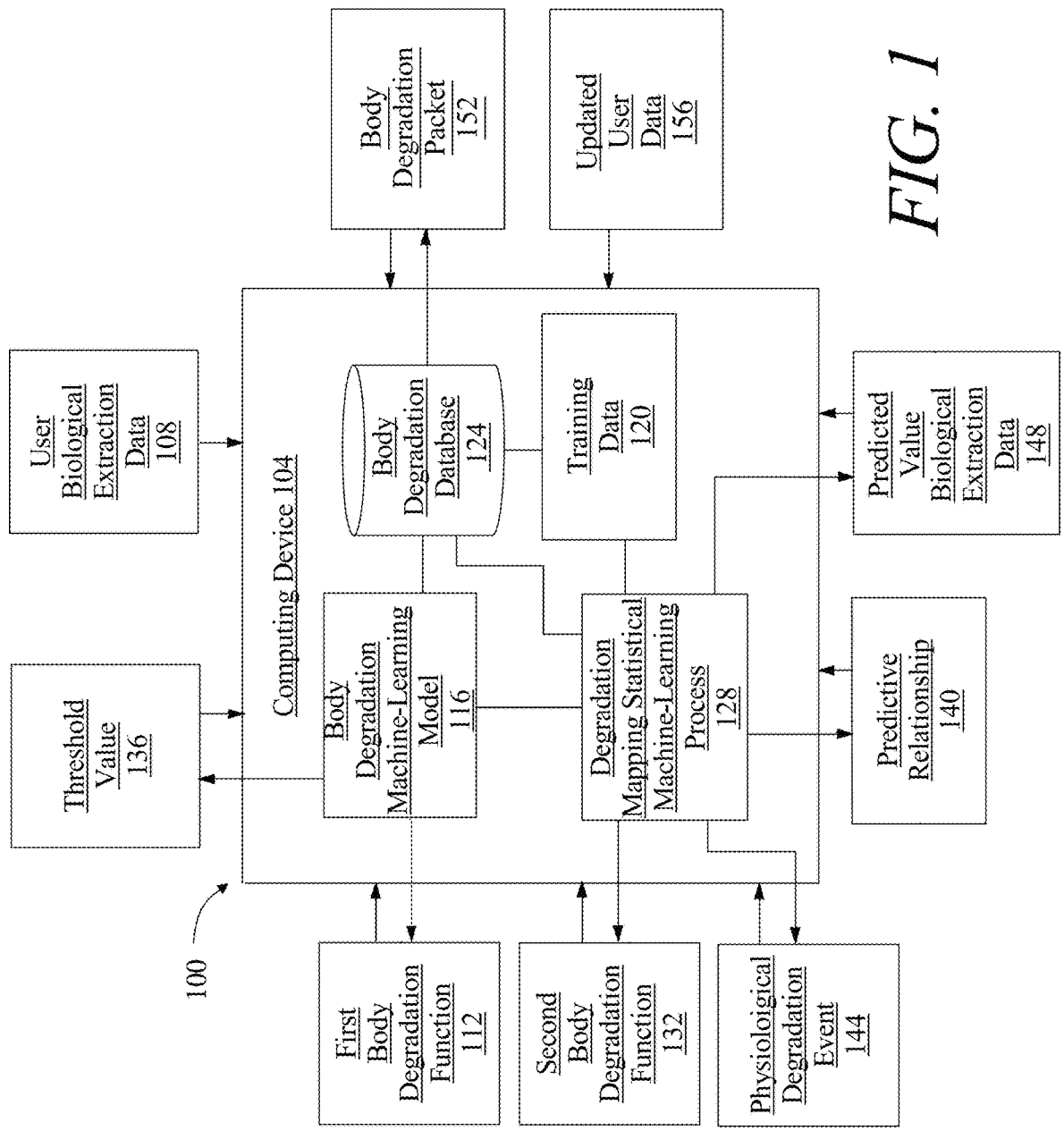
FIG. 1 is a block diagram illustrating a non-limiting exemplary embodiment of a system of identifying and enumerating cross-body degradations.

Referring now to FIG. 1, an exemplary embodiment of a system 100 for identifying and enumerating cross-body degradations is illustrated. System includes a computing device 104. computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 104 may include but is not limited to, for example, a computing device or cluster of computing devices in a first location and a second computing device or cluster of computing devices in a second location. computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

Computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing in reference to FIG. 1, computing device 104 may receive a biological extraction 108 pertaining to a user. A "biological extraction," as used in this disclosure refers to a least an element of biological extraction data, wherein biological extraction data refers to any biomarker, genetic data and analysis, epigenetic data and analysis, microbiome, medical history, pathophysiology, nutritional profile, or any chemical, biological, or physiological markers of data of a user, including for instance, and without limitation, as described in U.S. nonprovisional application Ser. No. 16/885,647, filed on Jul. 22, 2020, and entitled "METHODS AND SYSTEMS FOR DETERMINING A PLURALITY OF DIMENSIONS OF BIOLOGICAL EXTRACTION USER DATA AND ARTIFICIAL INTELLIGENCE," the entirety of which is incorporated herein by reference. Biological extraction 108 may originate from a wearable device, such as a pacemaker, gyrometer, accelerometer, bioimpedance monitor, pedometer, or any other wearable device and/or medical device. Biological extraction 108 may originate from a user questionnaire or any other source wherein the user provides information via an interface, wherein the information is a determination made by a user. User biological extraction 108 may origination from a medical professional, physician, caretaker, or the like, on behalf of a user. Computing device 104 may receive at least a biological extraction 108 by retrieval from a database, as described in further detail below. Computing device 104 may receive at least a biological extraction datum 108 via a user, wearable device, and/or secondary individual, via a graphical user interface (GUI), web-based platform, application, or the like. Persons skilled in the art, upon reviewing the entirety of this disclosure, will be aware of various ways in which biological extraction data may be received by a computing device for the purposes herein.

Continuing in reference to FIG. 1, computing device 104 may generate a first body degradation function 112, wherein generating the first body degradation function 112 may include training a body degradation machine-learning model 116 using training data 120 that correlates biological extraction 108 data with rates of biological degradation of the body. A 'body degradation function,' as used in this disclosure refers to a series of numerical values described by a function that maps, describes, or otherwise captures a projected level of degradation over the lifetime of the user, wherein degradation is physiological deterioration over time, otherwise referred to as 'body degradation', as a consequence of biological aging. The body degradation machine-learning model 112 may be trained with the biological extraction 108 data to calculate a biological degradation function of a user that is a mathematical function that describes the change in rate of degradation over time corresponding to the degradation data of the user. Body degradation machine-learning model 112 may be trained with training data 120 that is biological extraction 108 data pertaining to a user and/or may include data retrieved from a database, online repository, expert submissions, peer-reviewed research, and the like, wherein the data correlates biological extraction data with rates of biological degradation of a user.

As used in this disclosure, "biological degradation" refers to at least a current level of biological degradation and at least a rate of biological degradation, wherein the degradation level is a numerical parameter of physiological integrity and a rate of biological degradation refers to the parameter of degradation changing over time, as an individual ages. Biological degradation may refer to the natural loss and/or deterioration of physiological integrity of biological parameters, including for instance and without limitation, vision, hearing, chemosensory, cardiovascular endurance, muscular endurance, short-term memory, mental plasticity, skin tension, hairline, and the like. In non-limiting illustrative examples, body degradation machine-learning model 116 may train using training data 120 corresponding to at least an element of biological extraction data to determine a user's current physiological integrity of, for instance and without limitation skin tension, wherein the degradation machine-learning model 112 can determine the current level of a user's skin tension from for instance a 3-dimensional scanning analysis of Langer's lines present on a user's body, and determine for the user's age, height, sex, fitness level, family history, genetics, sun exposure, skin care product use, among other data, the user's current rate of skin tension and at what rate skin tension may be degrading. In such an example, the rate of degradation of skin tension could be no change, an increase, or a decrease in skin tension from year-to-year. Such a change in skin tension may perhaps be a degradation in skin tension of an amount that may be described, reflected, summarized, or otherwise communicated numerically as determined by the model trained with user data and skin tension data retrieved from, for instance, an online research database. In non-limiting illustrative examples, a first body degradation function 112 for such a user may illustrate that a user current skin tension level and the instantaneous rate of change and the projected rate of change at which the skin tension appears to change as the user ages.

Figure 2:
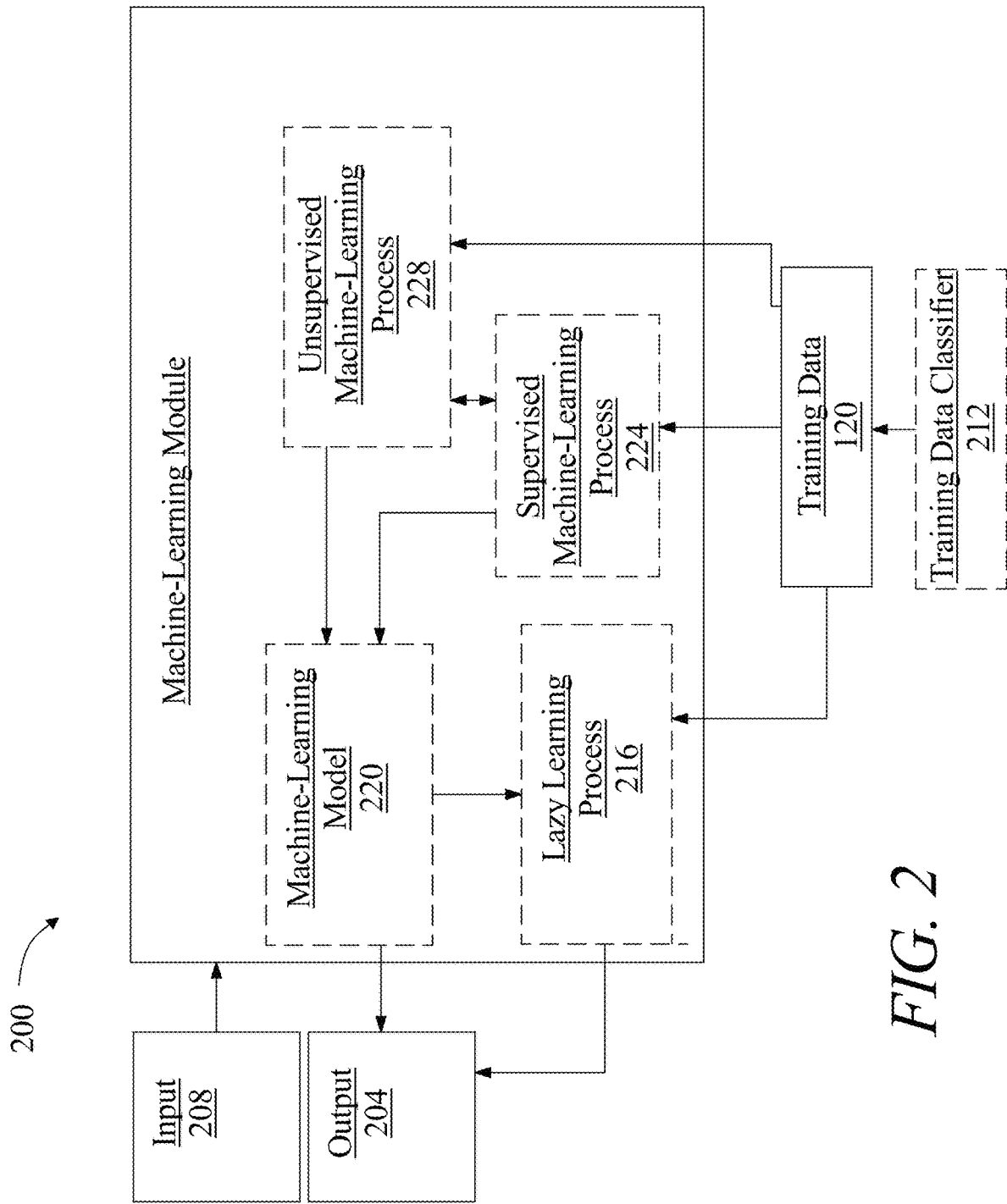
FIG. 2 is a block diagram illustrating a non-limiting exemplary embodiment of a machine-learning module.

Referring now to FIG. 2, an exemplary embodiment of a machine-learning module 200 that may perform one or more machine-learning processes as described in this disclosure is illustrated. Machine-learning module may include any suitable machine-learning module which may perform determinations, classification, and/or analysis steps, methods, processes, or the like as described in this disclosure using machine learning processes. A "machine learning process," as used in this disclosure, is a process that automatedly uses training data 120 to generate an algorithm that will be performed by a computing device/module to produce outputs 204 given data provided as inputs 208; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 120, which may include a plurality of data entries, each entry representing a set of data elements that were recorded, received, and/or generated together; data elements may be correlated by shared existence in a given data entry, by proximity in a given data entry, or the like. Multiple data entries in training data 120 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 120 according to various correlations; correlations may indicate causative and/or predictive links between categories of data elements, which may be modeled as relationships such as mathematical relationships by machine-learning processes as described in further detail below. Training data 120 may be formatted and/or organized by categories of data elements, for instance by associating data elements with one or more descriptors corresponding to categories of data elements. As a non-limiting example, training data 120 may include data entered in standardized forms by persons or processes, such that entry of a given data element in a given field in a form may be mapped to one or more descriptors of categories. Elements in training data 120 may be linked to descriptors of categories by tags, tokens, or other data elements; for instance, and without limitation, training data 120 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 120 may include one or more elements that are not categorized; that is, training data 120 may not be formatted or contain descriptors for some elements of data. Machine-learning algorithms and/or other processes may sort training data 120 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatically may enable the same training data 120 to be made applicable for two or more distinct machine-learning algorithms as described in further detail below. Training data 120 used by machine-learning module 200 may correlate any input data as described in this disclosure to any output data as described in this disclosure. As a non-limiting illustrative example, biological extraction data input and a body degradation function relating the biological extraction data to rates of physiological deterioration as an output.

Further referring to FIG. 2, training data 120 may be filtered, sorted, and/or selected using one or more supervised and/or unsupervised machine-learning processes and/or models as described in further detail below; such models may include without limitation a training data classifier 212. Training data classifier 212 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data 120. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 212 may classify elements of training data to match one or more categories including elements of user biological extraction data and/or biological degradation rates, such as without limitation a cohort of persons and/or other analyzed items and/or phenomena for which a subset of training data 120 may be selected.

Still referring to FIG. 2, machine-learning module 200 may be configured to perform a lazy-learning process 216 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 120. Heuristic may include selecting some number of highest-ranking associations and/or training data 120 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 220. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 220 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 220 may be generated by creating an artificial neural network, such as a convolutional neural network comprising an input layer of nodes, one or more intermediate layers, and an output layer of nodes. Connections between nodes may be created via the process of "training" the network, in which elements from a set of training data 120 are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 224. At least a supervised machine-learning process 224, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include biological extraction 108 as described above as inputs, degradation rates as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 120. Persons skilled in the art, upon reviewing the entirety of this disclosure, will be aware of various possible variations of at least a supervised machine-learning process 224 that may be used to determine relation between inputs and outputs. Supervised machine-learning processes may include classification algorithms as defined above.

Further referring to FIG. 2, machine learning processes may include at least an unsupervised machine-learning processes 228. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 220 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 2, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data 120 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data 120.

Referring now to FIG. 1, computing device 104 generating the first body degradation function 112 may include mapping at least a biological extraction 108 datum of a user to a current level of physiological integrity, determining an instantaneous rate of change of physiological integrity, and generating, as a function of the current level of physiological integrity and the instantaneous change, a function describing a projected level of degradation over the lifetime of the user. An "instantaneous rate of change," as used in this disclosure relates to the rate of change at any point in a body degradation function. A first body degradation function 112 may describe the numerical values determined from the model of the relationship of user biological extraction mapped to a level of physiological integrity of a biological function, wherein the values each include an instantaneous rate. The instantaneous rate may inform the numerical value of the next value in the function, wherein the next value is a projected physiological integrity for some point in the future. The first body degradation function 112 may thus be a mapping of current and past physiological integrity of a user informed by biological extraction 108 data and include projected values mapped by the function that anticipate physiological integrity for a period of time extending into the future over the lifetime of a user. For instance in non-limiting illustrative examples, a first body degradation function 112 may be an output of values generated by the body degradation machine-learning model that describe short-term memory ability as a function of time. In such an example, a user's short-term memory ability may be numerically described using a 'percent integrity', 'percentile', or the like, and each point in the function may have associated with it an instantaneous rate of change. In further non-limiting examples, each value and its instantaneous rate of change may inform the next value in the series of the function. Computing device 104 may store and/or retrieve any degradation functions and the associated values, rates, and other analytical parameters of a function, for instance and without limitation, first derivatives, second derivatives, local minima, local maxima, and the like, in a body degradation database 124.

Figure 3:
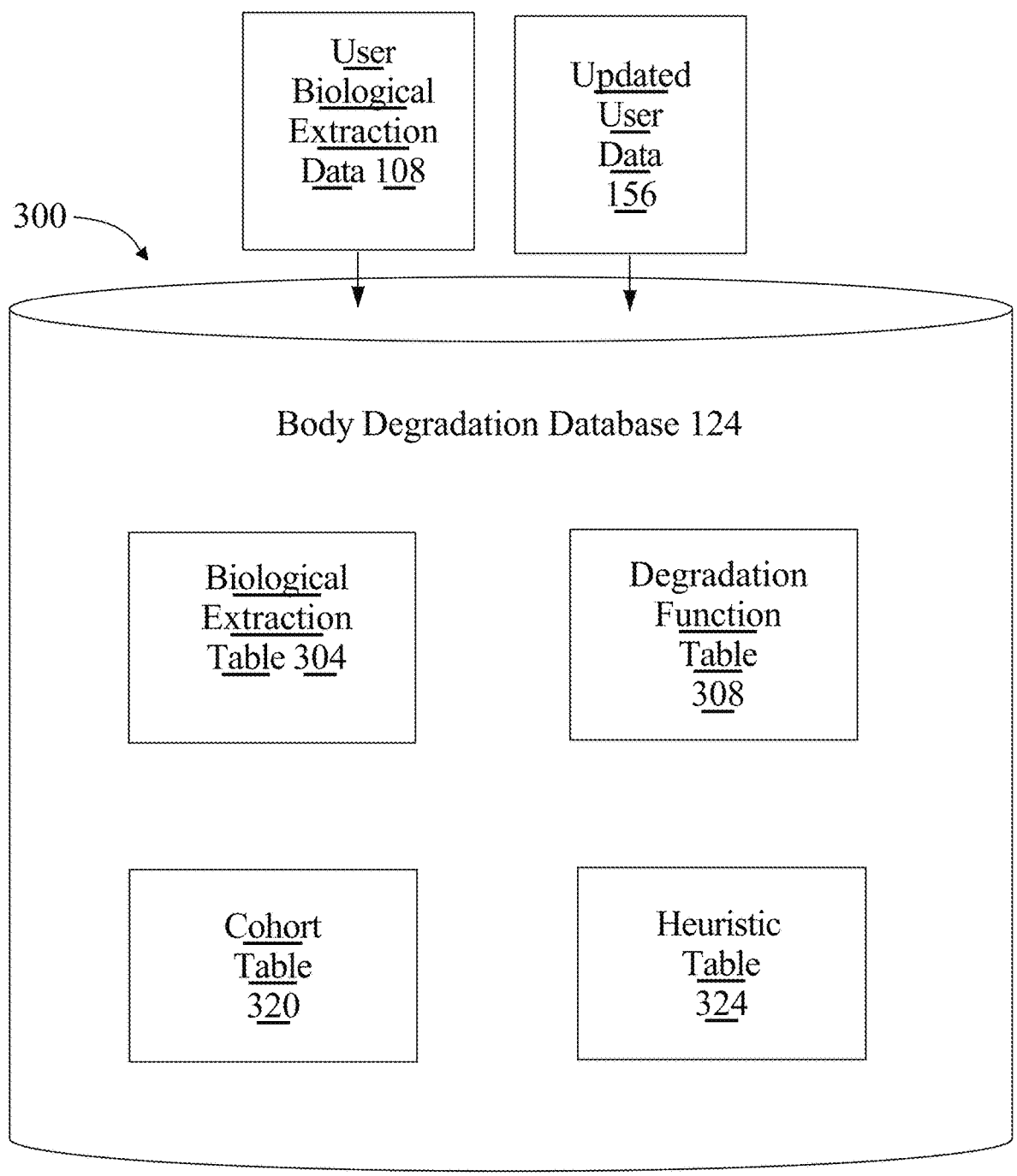
FIG. 3 is a block diagram illustrating an exemplary embodiment of a body degradation database.

Referring now to FIG. 3, a non-limiting exemplary embodiment 300 of a body degradation database 124 is illustrated. Body degradation database 124 may be implemented, without limitation, as a relational database, a key-value retrieval database such as a NOSQL database, or any other format or structure for use as a database that a person skilled in the art would recognize as suitable upon review of the entirety of this disclosure. Body degradation database 124 may alternatively or additionally be implemented using a distributed data storage protocol and/or data structure, such as a distributed hash table and the like. Body degradation database 124 may include a plurality of data entries and/or records, as described above. Data entries in a body degradation database 124 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Further referring to FIG. 3, body degradation database 124 may include, without limitation, a biological extraction table 304, degradation function table 308, cohort table 312, and/or heuristic table 316. Determinations by a machine-learning process, machine-learning model, scoring function, and/or computing device 104 may also be stored and/or retrieved from the body degradation database 124, for instance in non-limiting examples a classifier describing a plurality of destinations 108 as it relates to a predicted path. Determinations by a machine-learning model, for instance for calculating a degradation rate and/or a machine-learning process for determining statistical relationships between biological degradations, may also be stored and/or retrieved from the body degradation database 124. As a non-limiting example, body degradation database 124 may organize data according to one or more instruction tables. One or more body degradation database 124 tables may be linked to one another by, for instance in a non-limiting example, common column values. For instance, a common column between two tables of body degradation database 124 may include an identifier of a submission, such as a form entry, textual submission, degradation function. numerical value, and the like, for instance as defined below; as a result, a query may be able to retrieve all rows from any table pertaining to a given submission or set thereof. Other columns may include any other category usable for organization or subdivision of expert data, including types of expert data, names and/or identifiers of experts submitting the data, times of submission, and the like; persons skilled in the art, upon reviewing the entirety of this disclosure, will be aware of various ways in which data from one or more tables may be linked and/or related to data in one or more other tables.

Still referring to FIG. 3, in a non-limiting embodiment, one or more tables of a body degradation database 124 may include, as a non-limiting example, a biological extraction table 304, which may include elements of user biological extraction data, as described above, and any associated data relating to wearable device data, determinations made by an expert, medical professional, physical trainer, or the like, including medical history data, physiological measurements, medical conditions, diagnoses, diseases, or any other factors for use in determining body degradation, rates and/or levels of physiological deterioration, and/or other elements of data computing device 104 and/or system 100 may store, retrieve, and use to determine usefulness and/or relevance of biological extraction data in determining degradation rates, projected degradation values, and/or statistical relationships between physiological categories, as described in this disclosure. One or more tables may include degradation function table 308, which may include numerical values, functions, vectors, matrices, coordinates, graphical data, statistics, parameters, and the like, for instance and without limitation, that link user biological degradation, for instance in determining a current level of degradation, instantaneous rate, and/or projected rates of degradation to one or more physiological categories. One or more tables may include, without limitation, a cohort category table 312 which may contain one or more inputs identifying one or more categories of data, for instance demographic data, lifestyle data, physiological data, sleep pattern data, or the like, with regard to which users having matching or similar data may be expected to have similar degradation rates, levels, profiles, degradation imbalances, degradation antidote strategies, and/or instruction sets as a result of a machine-learning process determination, Monte Carlo simulation, ranking process output elements and/or other data input elements. One or more tables may include, without limitation, a heuristic table 316, which may include one or more inputs describing potential mathematical relationships between at least an element of user data and, for instance and without limitation, degradation rates, levels, functions, projected degradation values and rates, and rankings and/or determinations thereof, as described in further detail below.

Referring now to FIG. 1, computing device 104 may determine, using a degradation mapping statistical machine-learning process 128 and the first body degradation function 112, a second body degradation function 132, wherein the second body degradation function 132 describes a rate of biological degradation that is statistically associated with a first body degradation function. A rate of biological degradation that is statistically associated with a first body degradation function may correspond to different body parts, tissues, metabolic processes, etc. A "statistically associated" body degradation is a first biological degradation that is correlated, with some statistical significance, with a second biological degradation, even though the second biological degradation may not be directly observed and/or modeled from the biological extraction data itself. For instance and without limitation, a second biological degradation may be a predicted effect of a first biological degradation over time. In a non-limiting illustrative example, a first biological degradation function may describe the loss of mitochondrial integrity in cells of the digestive track over time according to the biological extraction data of a user, wherein a second biological extraction function that may be 'statistically associated' relates the user's gastric acid content. In such an example, the gastric acid content may represent a relationship that may be statistically inferred, calculated, or otherwise predicted from the first biological degradation function describing the mitochondrial integrity.

Continuing in reference to FIG. 1, statistical machine-learning process 128 may be a supervised and/or unsupervised machine-learning process, as described above. Alternatively or additionally, a statistical machine-learning process may be an online learning process, wherein an online machine learning process utilizes a method that, as data becomes available in a sequential order, the process is used to generate updated values that represent the best predictor for future data at each step. In online machine learning processes, whether applied in supervised and/or unsupervised learning, a function of $f\colon X \to Y$ is to be learned, wherein X is thought of as a space of inputs and Y as a space of outputs, and a prediction on the instances that may be drawn from a joint probability distribution, p(x, y), on X×Y. Machine-learning process may never determine the true distribution of p (x, y) over instances. Instead, the machine-learning process may access a training set of examples $(x_1, y_1), \ldots, (x_n, y_n)$. In this instance, a loss function may be given as $V\colon Y \times Y \to \mathbb{R}$, such that V (f(x), y) measures the difference between the predicted value f(x) and the true value, y. The ideal goal is to select a function $f \in \mathcal{H}$, where $\mathcal{H}$ is a space of functions called a 'hypothesis space', so that some notion of total loss is minimized. Depending on the type of model, such as a statistical model and/or an adversarial model, the statistical machine-learning process can devise different notions of loss, leading to different learning algorithms, and different variations of output values.

Statistical online machine learning process may use, for instance and without limitation, an empirical risk minimization, regularized empirical risk minimization, Tikhonov regularization, and the like, wherein the data in the training sample are assumed to have been drawn from a true distribution and the objective is to minimize the expected "risk" of a predicted value from the training sample, given some relationship between the predicted values and the training sample. In such examples, the choice of loss function may in minimization may be selected from a plurality of machine-learning algorithms such as regularized least squares analysis, linear least squares, stochastic gradient descent. Incremental stochastic gradient descent, batch learning, online convex optimization, support vector machines, and/or kernel methods. In a non-limiting illustrative example, any of the above algorithms may be performed by a degradation mapping statistical machine-learning process 128 wherein an input of a first set of values described by a first biological degradation function 112 are input, and a set of information may be retrieved that describes a relationship, correlation, or other heuristic that relates a second predicted set of values related in some manner to the first set of values. In such an example, a degradation mapping statistical machine-learning process 128 may output a series of values that correspond to a second biological degradation function 132 that represents predicted values that are statistically associated with a first set by use of an algorithm, as described above.

Statistical machine-learning process may be a reinforcement learning process, such as a Markov decision process (MDB), or the like. Reinforcement learning processes may be modeled as discrete-time stochastic control processes, wherein there exists a set of environment and agent states, S, a set of actions, A, of the agent, wherein $P_a(s, s') = Pr(s_{t+1}=s'|s_t=s, a_t=a)$ is the probability of transition, at time t, from state s to state s' under action, a. In such an example, the rules are often stochastic, in that numerical values may be randomly selected. It is assumed the agent may observe the current environment, or partially observe, wherein the set of actions is restricted, for instance, a numerical value of 0 may not be reduced below 0, for instance if the current value of the agent is 3, and the state transition reduces the value by 4, the transition will not be allowed, and an associated probability determined for the transition. In non-limiting illustrative examples, a reinforcement learning process may be utilized to determine the transition state of a particular set of values described in a first biological degradation function 112 to generate final values that correspond to a second biological degradation function 132, wherein the transition is dictated by some predicted relationship between the first and second function. Likewise, in non-limiting illustrative examples, a reinforcement learning process may be used to determine predicted values of biological degradation over long periods of time by optimizing a new state $s_{t+1}$ with a reward $r_{t+1}$ associated with the transition. The goal of the reinforcement learning agent is to collect as much reward as possible. The agent can choose any action, randomly or not, as a function of the history of values. In non-limiting illustrative examples, this may be performed to generate optimal predicted values of a second biological degradation function 132 wherein the biological extraction data may not directly inform what the values should be, but be used to optimally predict values for a long period, such as over the lifetime of a user.

Continuing in reference to FIG. 1, determining statistical association of second body degradation function 132 with first body degradation function 112 may include determining a current physiological integrity of a second body degradation, wherein the current physiological integrity describes the degree the body has currently degraded compared to a preconfigured threshold value 136. A "threshold value," as used herein, refers to a theoretical biological integrity level, theoretical rate of change of the biological integrity level, and theoretical integrity function for a user according to a degradation mapping statistical machine learning process 128 trained with training data 120 that determines what the 'percent integrity' of a user's physiology and rate of biological degradation that may be theoretically predicted of a 'healthy' individual that most closely matches the user's sex, age, height, fitness level, medical history, among other biological extraction parameters; otherwise a 'scientifically comparable' threshold value. For instance, in non-limiting illustrative examples, a preconfigured threshold value 136 for bone density may be the predicted rate of bone density deterioration, degradation, and/or change of rate, that would be anticipated of bone density level over time and the associated rate of degradation for a person of a particular age, sex, activity level, nutritional profile, and the like. Such a preconfigured threshold value 136 may be determined using a machine-learning model, such as a body degradation machine-learning model 116 trained with training data 120 that corresponds to, for instance and without limitation, a subset of users identified by a classifier. A machine-learning model may be trained using training data 120 by a machine-learning module, including using a machine-learning process, as described above. The threshold value 136 may be represented by a numerical value, function, matrix, vector, or the like, stored in computing memory to be used to compared to a biological degradation function, such as a second biological degradation function 132.

Deviation above or below such a threshold value 136 may indicate that there is an increased or decreased rate of degradation. A threshold value 136 may be calculated for each body degradation function that is generated to determine the degree to which the body has already degraded. A threshold value 136 may be used to compare the current, instantaneous rate of degradation for a body degradation function to a threshold value 136 of rate. A threshold value 136 may be used to improve the statistical significance of a second body degradation function in relation to a first body degradation function, wherein the current level of degradation for the second body degradation function may be more accurately assessed, and the values refined.

Continuing in reference to FIG. 1, computing device 104 determining statistical association of second body degradation function 132 with first body degradation function 112 may include determining an instantaneous rate of change of a second body degradation and its effect on the instantaneous change of the first body degradation function. Computing device may use a degradation mapping statistical machine-learning process 128 to determine a value for the current instantaneous rate of change of the values depicted in the second body degradation function 132. The instantaneous rate of change may be a current rate of degradation for how the body degradation described by the function is undergoing biological degradation over a short-term period; for instance and without limitation, a short-term period may be days, weeks, months, years, and the like, depending on the time sampling for determining rates. In non-limiting illustrative examples, instantaneous rate of a second body degradation function may show that the physiological category of short-term memory is undergoing degradation faster than a threshold value would otherwise indicate. In such an example, this faster than expected pace of degradation may be accelerate the rate of degradation of a first body degradation function such as vision acuity. In further non-limiting illustrate examples, this may suggest that as the user's vision is degrading, the user is having difficulty internalizing and memorizing things in the short term, likely due to reduced ability to accurately see and log information. Comparing the instantaneous rates of change of the two functions to threshold values may indicate that a positive feedback loop exists, wherein as vision degrades, ability to build and access short-term memory degrades, and as memory degrades the body strains its eyes to see more. In this example, user may not be aware of this relationship, and the biological extraction may not have contained any data that corresponds to memory ability of the user.

Continuing in reference to FIG. 1, computing device 104 determining statistical association of second body degradation function 132 with first body degradation function 112 may include determining a predicted degradation function of the second physiological parameter associated with the second body degradation function, wherein the predicted degradation function comprises at least a further degradation datum for the second body degradation. A "biological datum," as used in this disclosure is a numerical value, point, rate, or the like, that describes some capacity of body degradation, which may be contained in a body degradation function. Computing device 104 determining the second body degradation function 132 using the degradation mapping statistical machine-learning process 128 may generate an output of a series of predicted values of physiological degradation extending forward in time, each with an associated instantaneous rate, confidence interval, and the like. Second body degradation function 132 may be entirely composed of predicted values that are not contained in the biological extraction data and are statistically extrapolated from the first body degradation function.

Figure 4:
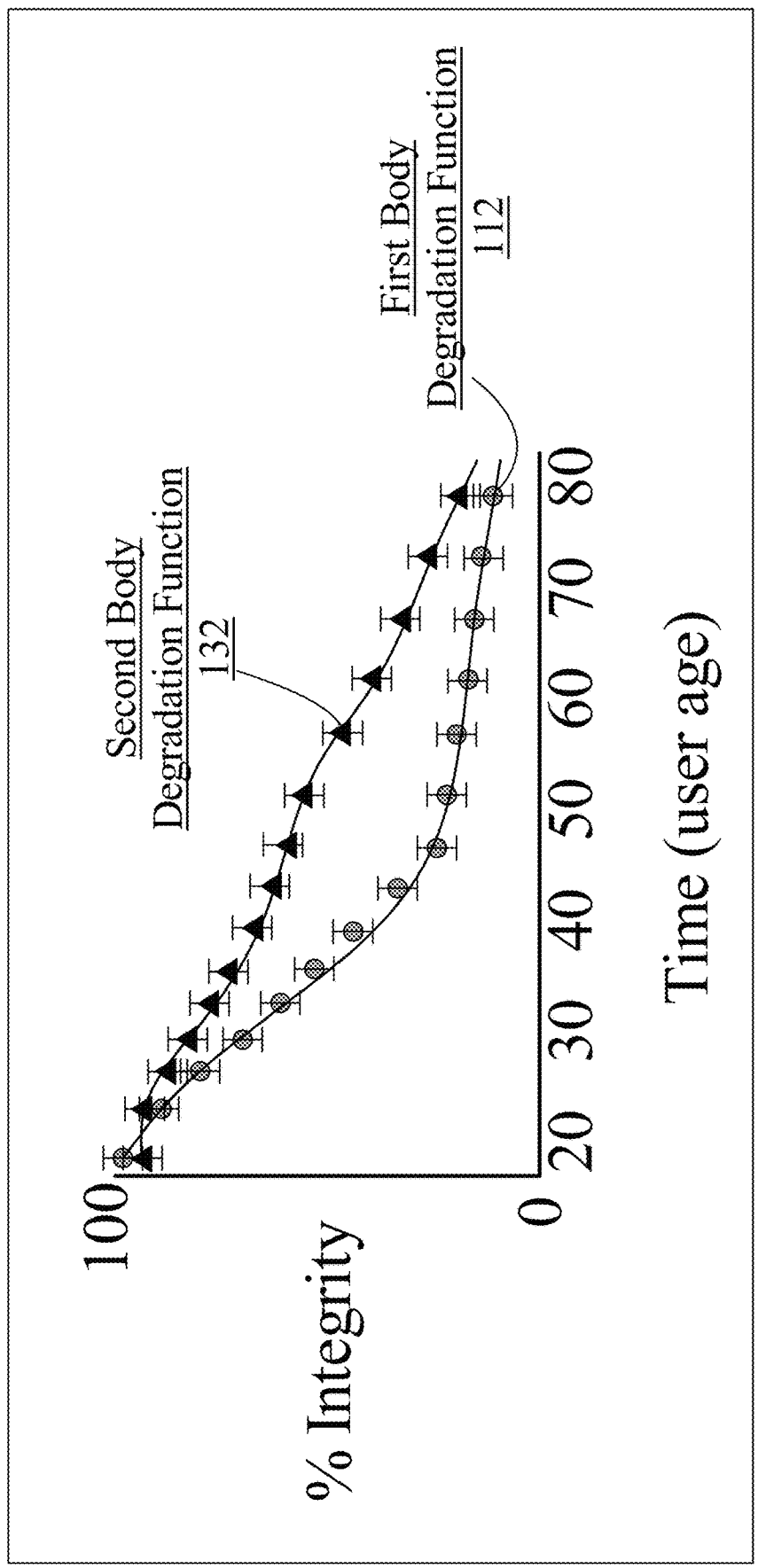
FIG. 4 is a diagrammatic representation illustrating of an exemplary embodiment of a first body degradation function and a second body degradation function.

Referring now to FIG. 4, a non-limiting exemplary embodiment 400 of a first body degradation function 112 and a second body degradation function 132 is illustrated. Computing device 104 may use a body degradation machine-learning model 116 trained with biological extraction 108 data to generate an output of a first body degradation function 112 denoted by the curve with grey circles, each point representing a mean ± a confidence interval. Computing device 104 may use a degradation mapping statistical machine-learning process 128 to output a second body degradation function 132 denoted by the curve with black triangles, each point representing a mean ± a confidence interval. A second body degradation function 132 may be statistically associated with a first body degradation function 112, wherein each point of the second body degradation function 132 is related numerically to a point in the first body degradation function 132. Each point may have associated with it an instantaneous rate of change, and each point on the timeline after and/or before a user's current age may be a predicted value created by a computing device using a body degradation machine-learning model 116 and/or a degradation mapping statistical machine-learning process 128. In non-limiting illustrative examples, FIG. 4 illustrates that a second body degradation function 132 shows physiological percent integrity decreases alongside a first body degradation function 112, but at different rates, wherein the rates change as the user ages. Each point of the first body degradation function 112 has associated with it a second body degradation function 132, and at least a relationship between the two. The relationship may be represented by a numerical value, function, matric, vector, and the like.

Continuing in reference to FIG. 1, computing device may identify, using the first body degradation function 112 and the second body degradation function 132, a predictive relationship 140 between the first body degradation function 112 and the second body degradation function 132 according to the biological extraction datum. A "predictive relationship," as used in this disclosure is a determinative relationship between body degradation functions, such as a causative relationship, correlational relationship, directly and/or indirectly proportional relationship, and the like. A predictive relationship is a mathematical function that predicts a change in future biological extraction data. A predictive relationship may determine what form future biological extraction data may assume. For instance in non-limiting illustrative examples, a predictive relationship may determine that according to a body degradation function 112 and the second body degradation function 132 biological extraction data reflecting the relationship between the two may begin to appear during the user's lifetime, at the predictive time points. In further non-limiting illustrative examples, this may be predictive medical diagnoses, health conditions, wearable device data, blood chemistry results, epigenetic changes, lifestyle changes, and the like. A predictive relationship may be determined by a machine-learning process, such as a degradation mapping statistical machine-learning process 128, wherein an input of a first body degradation function 112 and a second body degradation function 132 may determine a predictive relationship between the two according to information retrieved from a database, such as an online research repository. In such an example, a machine-learning process may retrieve information that shows once a percent integrity of a physiological category reaches a threshold, a medical condition may present itself. The medical condition may manifest in a manner that has an expected, calculated effect on biological extraction data. A time point may be predicted, with some statistical certainty, at which it is predicted the biological extraction data will reflect the clinical manifestation of the condition and the diagnosis of the condition.

Continuing in reference to FIG. 1, computing device 104 identifying the predictive relationship 140 may include mapping a first physiological degradation event 144 of a user to a cause of a second body degradation. Computing device 104 identifying the predictive relationship 140 may include determining if there is any physiological degradation event 144 that is contributing to the cause of the second body degradation integrity level and rate of degradation. A physiological degradation event may be a user experience, medical condition, diagnosis, lifestyle event, or the like, that contributes to the integrity level and degradation rate of a second body degradation which may or may not be located in the biological extraction data 108 originally provided to computing device 104. Computing device 104 may use a machine-learning process, such as a degradation mapping statistical machine-learning process 128 and/or any other type of machine-learning process, as described above, to identify a physiological degradation event 144 that may explain the second body degradation function 132 and/or the first body degradation function 112.

A machine-learning process may identify and output a physiological degradation event 144 by performing a query of an online research repository, expert submission, web-search, database, such as a body degradation database 124, among other sources. A machine-learning process may identify and output a physiological degradation event 144 by using a classifier that describes a subset of data of alike users based on body degradation functions, rates, biological extraction data 108, and the like, as described above. In non-limiting illustrative examples, computing device 104 may identify a physiological degradation event 144 of a user that is a specific past instance that may explain a body degradation rate, for instance a physical trauma such as a car accident, which may explain the predictive relationship 140 describing the physiological deterioration of a seemingly unaffected biological parameters years later. A physiological degradation event 144 may have associated with it a series of numerical values, functions, statistics, and the like, that describe the accuracy of the identified event, the periodicity of occurrence, the intensity, frequency, duration, and the like, of an event. In such an instance, the physiological degradation event 144 may be a plurality of events that are ranked, weighted, and/or otherwise reported based on their associated statistical relevancy, 'figure of merit' as an explanation, and the like, to the predictive relationship 140.

Referring back to FIG. 1, computing device 104 identifying the predictive relationship may include using the degradation mapping statistical machine-learning process 128 to calculate a statistically suitable range of predicted values of biological extraction data 148 over a range of time as a function of the first body degradation function and the second body degradation. A statistically-relevant range of predicted values of biological extraction data may be output by a degradation mapping statistical machine-learning process 128 that provides a range of numerical values for each numerical value of a body degradation function that provides a range and accuracy for each predicted value. A "statistically-relevant" range of predicted values as used herein, is a range of predicted values that are statistically significant as determined by a statistical evaluation, as described above, wherein the 'relevancy' of the range of values may be assessed by a threshold value, as described above.

Figure 5:
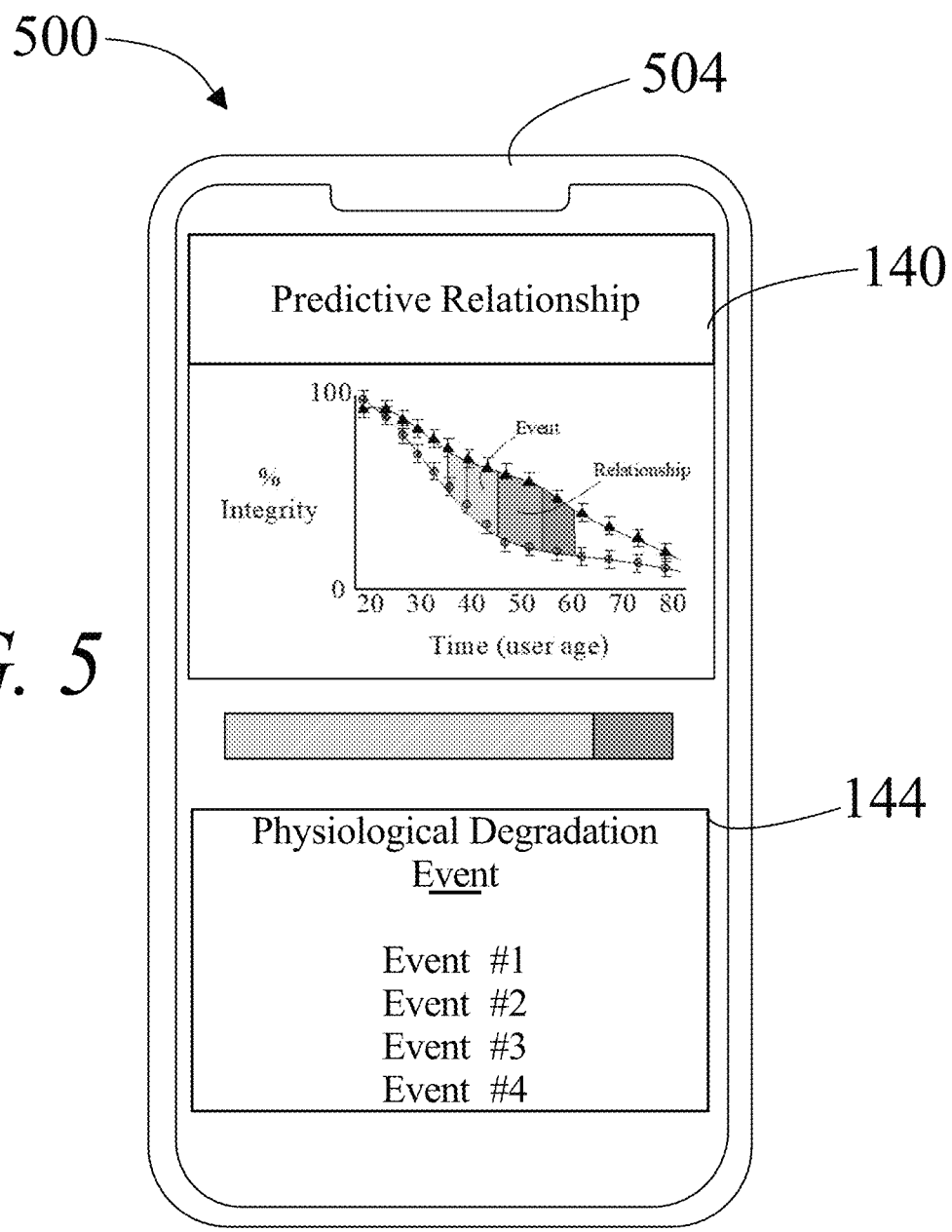
FIG. 5 is a diagrammatic representation illustrating of an exemplary embodiment of the predictive relationship and physiological degradation event provided via a user device.

Referring now to FIG. 5, a non-limiting exemplary embodiment 500 of predicted values of biological extraction data 148 within a statistically suitable range of relative to a threshold value 136 is illustrated. Computing device 104 may determine calculated biological extraction parameters from at least a body degradation function. Computing device 104 may input a current level of physiological integrity, a rate of degradation, the predicted values of physiological integrity, the received biological extraction data, and/or some relationship generated by a machine-learning model, retrieved from an online research repository, among other sources, to generate an output of predicted values that describe hypothetical biological extraction data for a user.

In non-limiting illustrative examples, FIG. 5 illustrates a set of predicted values of biological extraction data 148 plotted over the lifetime of a user (solid curve with triangles). The curve contains a range of values (illustrated as dashed lines) above and below the predicted values that denote the statistically suitable range of predicted values. In the example illustrated in FIG. 5, the curves describe a user's bone density from a bone mineral density (BMD) determined from a dual-energy X-ray absorptiometry scanning. The threshold value 136 (horizontal, dotted line) represents the mean healthy young adult BMD value, wherein values above or below represent values based on a standard deviation scale from the threshold value 136. The data shows that the user is predicted to have a healthy BMD through their 20's and into their 30's. The moment on the graph where the predicted values of biological extraction data 148 dip below two standard deviations below the threshold (−2.0) the system 100 may determine that represents a physiological degradation event 144 wherein user may be at high risk for osteoporosis. The system 100 may provide the user with information that details from age ~50 onward, the rate of BMD loss increases and the values are predicted to be more than one standard deviation (−1.0+) below the threshold value, indicating low bone mass and increased risk for fracture. This information may be stored and/or retrieved from a body degradation database 124 and provided to a user via a user device.

Referring back to FIG. 1, computing device 104 may generate a body degradation packet 152, wherein the body degradation packet describes the first body degradation function 112 and the second body degradation function 132. A "body degradation packet," as used in this disclosure is a description of the first body degradation function and the second body degradation function containing a predictive relationship 140 between a first body degradation function 112 and a second body degradation function 132, physiological degradation event 144, and at least a predicted value of biological extraction data 148.

Figure 6:
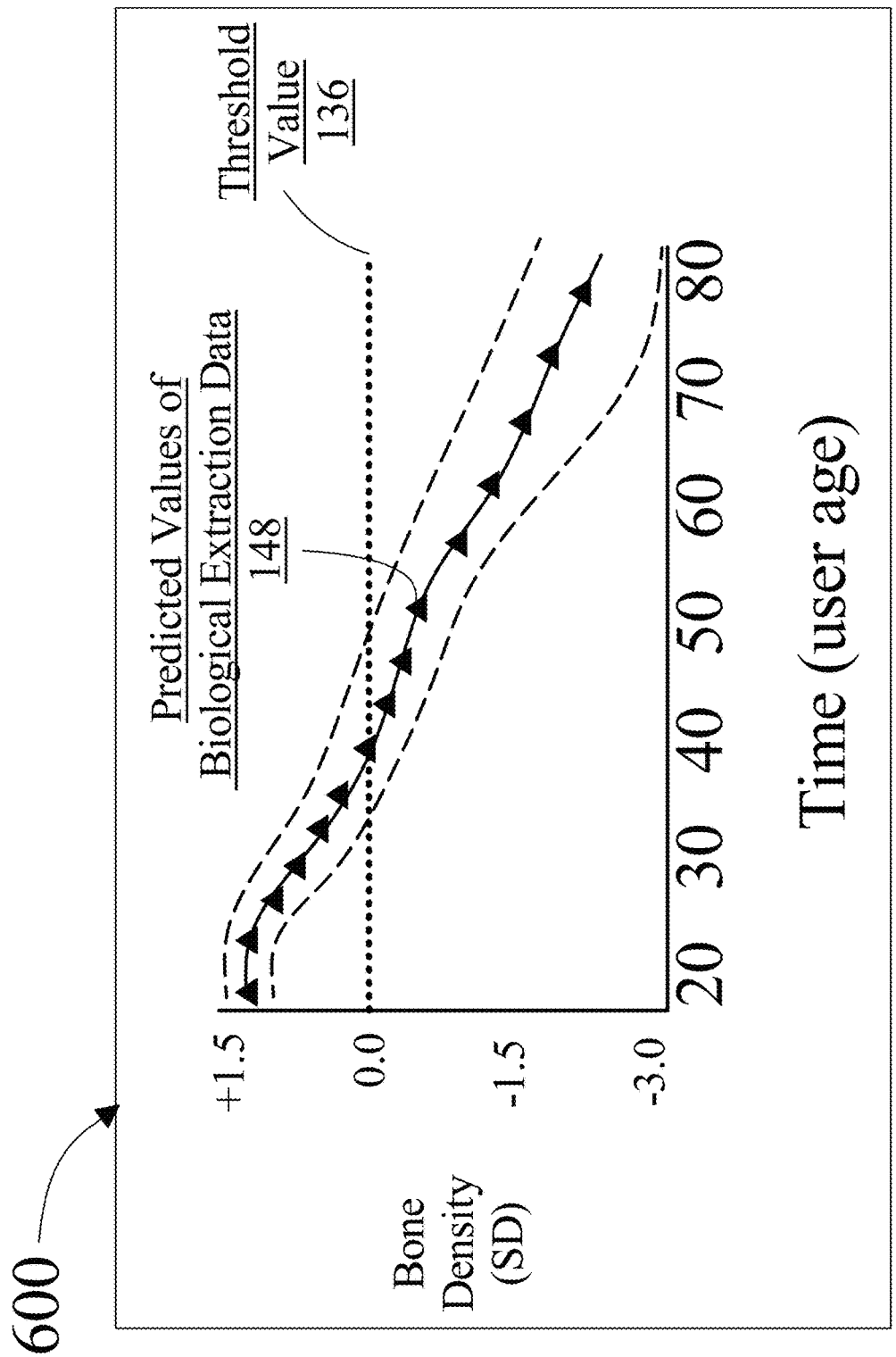
FIG. 6 is a diagrammatic representation illustrating of an exemplary embodiment of a predictive relationship and physiological degradation event provided via a user device.

Referring now to FIG. 6, a non-limiting exemplary embodiment 600 of the predictive relationship 140 and physiological degradation event 144 provided to the user via a user device 604 is illustrated. Computing device 104 may provide data to a user via a user device including the predictive relationship 140, physiological degradation event 144, first body degradation function 112, second body degradation function 132, and any accompanying numerical values, functions, statistics, graphics, and the like. A user device 604 may be a smartphone, computer, tablet, laptop, TV, or any other electronic device suitable for displaying text, graphics, or the like, via a graphical user interface (GUI), or any other suitable interface. Persons skilled in the art, upon reviewing the entirety of this disclosure, will be aware of various ways in the determinations generated herein, among other outputs form system 100, may be displayed via a user device 604 and what devices may be usable as a user device 604.

Continuing in reference to FIG. 1, computing device 104 may receive updated user data 156, wherein updated user data 156 is user data provided more recent in time than a first body degradation function was provided to a user. In non-limiting illustrative example, computing device may train a body degradation machine-learning model 116 using training data 120 that corresponds to the updated user data 156 as it compares to a biological degradation rate. Computing device may use the body degradation machine-learning model 116, trained as described before, and use the updated user data 156 with such a model to calculate a numerical difference between a biological degradation rate and the updated biological degradation rates from the updated user data 156, and determine if a parameter in the updated biological extraction data resulted in a numerical difference between the predicted biological extraction parameter and the updated user data 156. Updated user data 156 may refer to any biological extraction data, as described above. Computing device 104 may generate a biological degradation rate using a body degradation machine-learning model 112 trained with the updated user data 156 described above and as illustrated in FIG. 1-6. A biological degradation rate includes a series of values that may be mapped as a function of biological degradation over time, wherein each value has a rate associated therewith.

Continuing in reference to FIG. 1, computing device 104 may determine a numerical difference between a biological degradation rate generated from biological extraction data 108 and an updated biological degradation rate generated from updated user data 156, as described above. A numerical difference may be calculated using any mathematical operation, such as subtraction, as described above. Numerical difference may be calculated using a computing device 104 that may store and/or retrieve values from a body degradation database 124, as described above.

Continuing in reference to FIG. 1, computing device 104 may determine if a parameter in the updated biological extraction data resulted in a numerical difference between the predicted biological extraction parameter and the updated user data 156. Computing device 104 may determine a numerical difference using any mathematical operation, such as subtraction, as described above. In non-limiting illustrative examples, computing device 104 may determine a numerical difference by using a degradation mapping statistical machine-learning process 128. In such an example, degradation mapping statistical machine-learning process 128 may accept an input of an updated biological degradation function, including any values and rates, and compare the numerical values of the function to predicted values retrieved from a body degradation database 124. Predicted values may be numerical values that were determined for a first body degradation function 112, second body degradation 132, and the like. Degradation mapping statistical machine-learning process 128 may refine the predicted values of a first body degradation function 112 and/or second body degradation function 132 using biological degradation function, including any values and rates, calculated from updated user data 156.

Figure 7:
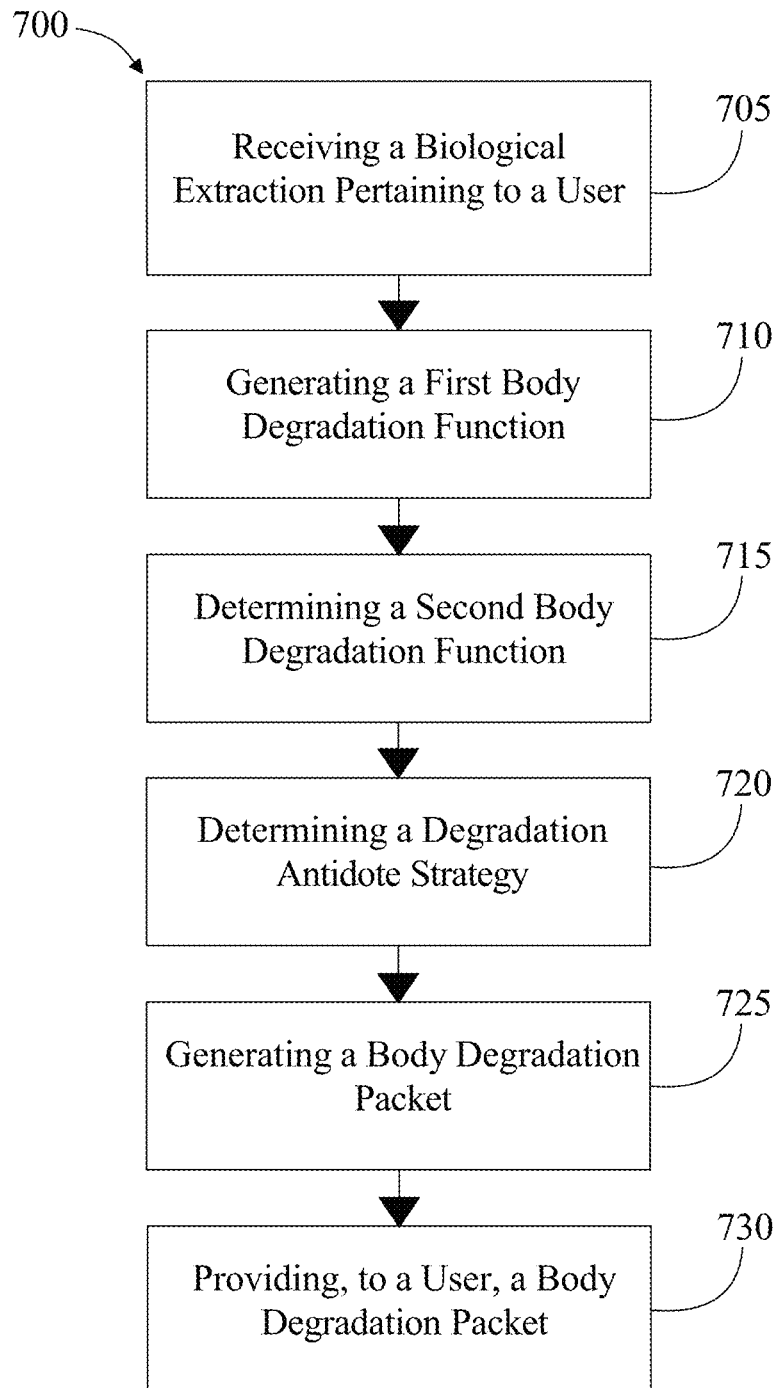
FIG. 7 is a flow diagram illustrating an exemplary method for identifying and enumerating cross-body degradations.

Referring now to FIG. 7, an exemplary embodiment of a method 700 for identifying and enumerating cross-body degradations is illustrated. At step 705, computing device may receive a biological extraction 108 pertaining to a user; this may be implemented, without limitation, as described above in reference to FIGS. 1-6.

At step 710, computing device 104 may generate a first body degradation function 112, wherein generating the first body degradation datum may include training a body degradation machine-learning model 116 using training data 120 that correlates biological extraction data with rates of biological degradation of the body, and generating the first body degradation function 112 as a function of the body degradation machine-learning model 116 and the biological extraction 108. Generating the first body degradation function 112 may include mapping at least a biological extraction 108 datum of a user to a current level of physiological integrity, determining an instantaneous rate of change of physiological integrity, and generating, as a function of the current level of physiological integrity and the instantaneous change, a function describing a projected level of degradation over the lifetime of the user; this may be implemented, without limitation, as described above in reference to FIGS. 1-6.

At step 715, computing device 104 determine, using a degradation mapping statistical machine-learning process 128 and the first body degradation function 112, a second body degradation function 132, wherein the second body degradation function 132 describes a rate of biological degradation that is statistically associated with a first body degradation function. A second body degradation 132 statistically associated with a first body degradation 112 may include determining a current physiological integrity of a second body degradation 132, wherein the current physiological integrity describes the degree the body has currently degraded compared to a threshold value 136. The second body degradation 132 statistically associated with a first body degradation function 112 may include determining an instantaneous rate of change of a second body degradation 132 and its effect on the instantaneous change of a first body degradation function 112. The second body degradation 132 statistically associated with a first body degradation function 112 may include determining a predicted degradation function of the second physiological parameter associated with the second body degradation function 132, wherein the predicted degradation function comprises at least a further degradation datum for the second body degradation 132; this may be implemented, without limitation, as described above in reference to FIGS. 1-6.

At step 720, computing device 104 may identify, using the first body degradation function 112 and the second body degradation function 132, a predictive relationship between the first body degradation function 112 and the second body degradation function 132 according to the biological extraction 108 datum. Identifying the predictive relationship may include mapping a first physiological degradation event of a user to a cause of a second body degradation 132; this may be implemented, without limitation, as described above in reference to FIGS. 1-6.

At step 725, computing device 104 may generate a body degradation packet 152, wherein the body degradation packet 152 describes the first body degradation function 112 and the second body degradation function 132; this may be implemented, without limitation, as described above in reference to FIGS. 1-6.

At step 730, computing device 104 may provide to a user, the body degradation packet 152. Providing the body degradation packet 152 to a user may include displaying the body degradation packet 152 data via a user device 504. Computing device 104 may receive updated user data 156, wherein updated user data 156 is user data provided more recent in time than a first body degradation function 112 was provided to a user. Computing device 104 may train the body degradation machine-learning model 116 using training data 120 that corresponds to the updated user data 156 as it compares to a biological degradation rate. Computing device 104 may calculate, using the body degradation machine-learning model 116 trained with updated user data 156, a numerical difference between a biological degradation rate and the updated biological degradation rates from the updated user data 156, and determine if a parameter in the updated user data 156 resulted in a numerical difference between the predicted biological extraction parameter and the updated user data; this may be implemented, without limitation, as described above in reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
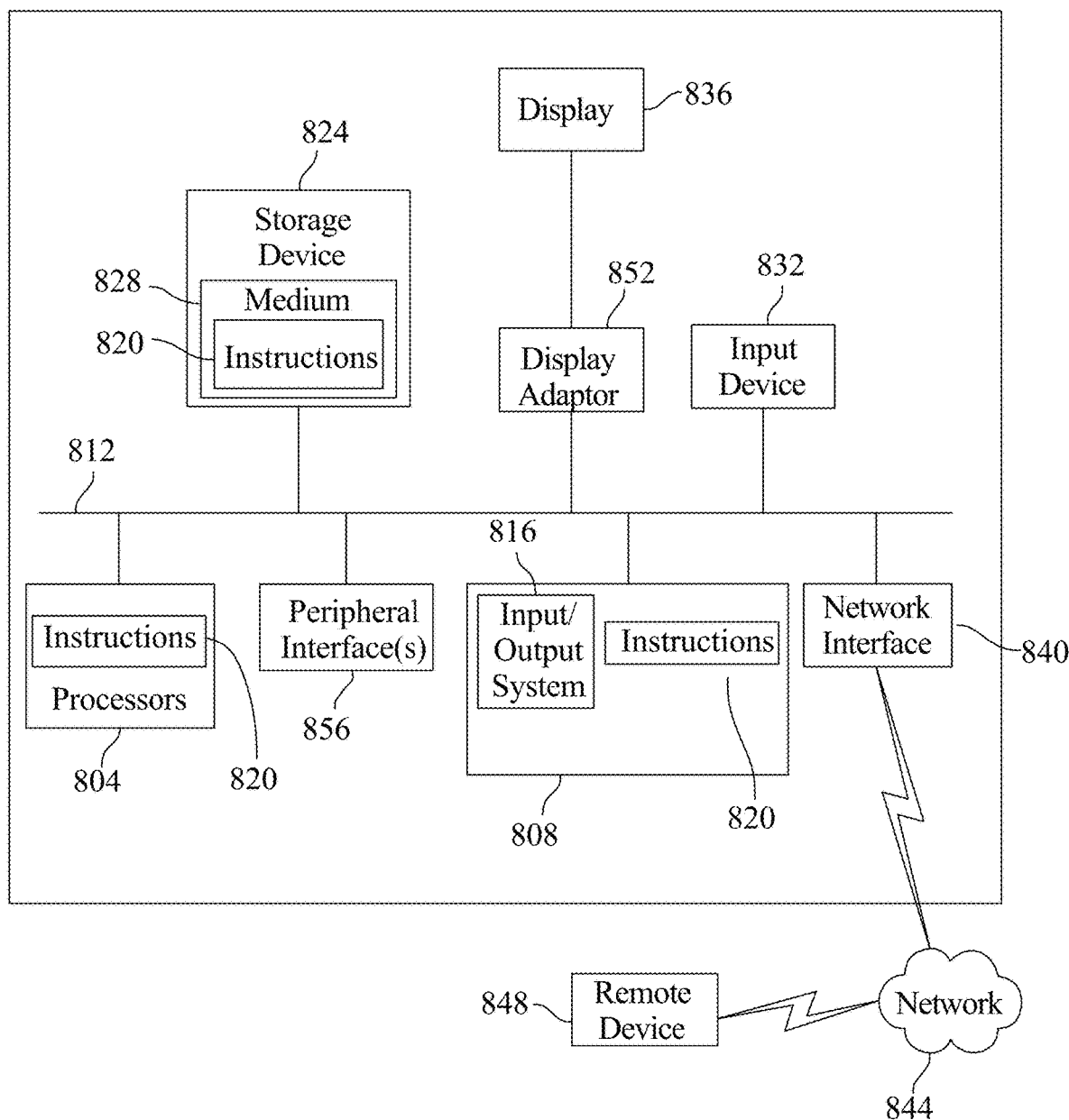
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for identifying and enumerating cross-body degradations, the system comprising:
a computing device, wherein the computing device is designed and configured to:
receive a biological extraction pertaining to a user;
generate a first body degradation function, wherein the first body degradation function includes a numerical score indicating a current physiological deterioration of a first biological parameter due to age, wherein the first biological parameter comprises a visual acuity parameter of the user, and wherein generating the first body degradation function further comprises:
training a body degradation machine-learning model using training data that correlates biological extraction data with rates of biological degradation of a body of the user; and
generating the first body degradation function as a function of the body degradation machine-learning model and the biological extraction;
determine, using a degradation mapping statistical machine-learning process and the first body degradation function, a second body degradation function, wherein the second body degradation function describes a rate of biological degradation that is statistically associated with the first body degradation function, and wherein the second body degradation function corresponds to a second biological parameter different from the first biological parameter, wherein the second biological parameter comprises a memory ability parameter of the user;
identify, using the first body degradation function and the second body degradation function, a predictive relationship between the first body degradation function and the second body degradation function according to the biological extraction;
generate a body degradation packet, wherein the body degradation packet describes the first body degradation function and the second body degradation function; and
provide to the user, the body degradation packet.

2. The system of claim 1, wherein generating the first body degradation function further comprises:
mapping at least a biological extraction datum of the user to a current level of physiological integrity;
determining an instantaneous rate of change of physiological integrity; and
generating, as a function of the current level of physiological integrity and the instantaneous change, the first body degradation function.

3. The system of claim 1, wherein the computing device is configured to determine the second body degradation function by determining a current physiological integrity of a second body degradation, wherein the current physiological integrity describes a degree the body has currently degraded compared to a threshold value.

4. The system of claim 1, wherein the computing device is configured to determine the second body degradation function by statistically associating the second body degradation function with the first body degradation function by determining an instantaneous rate of change of a second body degradation and its effect on the instantaneous change of the first body degradation function.

5. The system of claim 1, wherein the computing device is configured to determine the second body degradation function by determining a predicted degradation function of the second biological parameter associated with the second body degradation function, wherein the predicted degradation function comprises at least a further degradation datum for the second body degradation function.

6. The system of claim 1, wherein identifying the predictive relationship further comprises mapping a first physiological degradation event of the user to a cause of a second body degradation.

7. The system of claim 6, wherein the predictive relationship is provided to the user via a user device.

8. The system of claim 1 wherein identifying the predictive relationship further comprises using the degradation mapping statistical machine-learning process to calculate a statistically-suitable range of predicted values of biological extraction data over a range of time as a function of the first body degradation function and the second body degradation function.

9. The system of claim 1, wherein providing the body degradation packet to the user further comprises displaying the body degradation packet data via a user device.

10. The system of claim 1, wherein the computing device is designed and configured to:
receive updated user data, wherein updated user data is user data provided more recent in time than the first body degradation function was provided to the user;
calculate, using the body degradation machine-learning model and the updated user data, a numerical difference between a biological degradation rate and updated biological degradation rates from the updated user data; and
determine if a parameter in the updated user data resulted in a numerical difference between a predicted biological extraction parameter and the updated user data.

11. The system of claim 1, wherein the first body degradation function further includes a numerical score indicating a rate of physiological deterioration due to age.

12. A method for identifying and enumerating cross-body degradations, the method comprising:
receiving, by a computing device, a biological extraction pertaining to a user;
generating, by the computing device, a first body degradation function, wherein the first body degradation function includes a numerical score indicating a current physiological deterioration of a first biological parameter due to age, wherein the first biological parameter comprises a visual acuity parameter of the user, and wherein generating the first body degradation function further comprises:
training a body degradation machine-learning model using training data that correlates biological extraction data with rates of biological degradation of a body of the user; and
generating the first body degradation function as a function of the body degradation machine-learning model and the biological extraction;
determining, by the computing device, using a degradation mapping statistical machine-learning process and the first body degradation function, a second body degradation function, wherein the second body degradation function describes a rate of biological degradation that is statistically associated with the first body degradation function, and wherein the second body degradation function corresponds to a second biological parameter different from the first biological parameter, wherein the second biological parameter comprises a memory ability parameter of the user;
identifying, by the computing device, using the first body degradation function and the second body degradation function, a predictive relationship between the first body degradation function and the second body degradation function according to the biological extraction;
generating, by the computing device, a body degradation packet, wherein the body degradation packet describes the first body degradation function and the second body degradation function; and providing by the computing device, to the user, the body degradation packet.

13. The method of claim 12, wherein generating the first body degradation function further comprises:
mapping at least a biological extraction datum of the user to a current level of physiological integrity;
determining an instantaneous rate of change of physiological integrity; and
generating, as a function of the current level of physiological integrity and the instantaneous change, the first body degradation function.

14. The method of claim 12, wherein the computing device is configured to determine the second body degradation function by determining a current physiological integrity of a second body degradation, wherein the current physiological integrity describes a degree the body has currently degraded compared to a threshold value.

15. The method of claim 12, wherein the computing device is configured to determine the second body degradation function by statistically associating the second body degradation function with the first body degradation function by determining an instantaneous rate of change of a second body degradation and its effect on the instantaneous change of the first body degradation function.

16. The method of claim 12, wherein the computing device is configured to determine the second body degradation function by determining a predicted degradation function of the second biological parameter associated with the second body degradation function, wherein the predicted degradation function comprises at least a further degradation datum for the second body degradation function.

17. The method of claim 12, wherein identifying the predictive relationship further comprises mapping a first physiological degradation event of the user to a cause of a second body degradation.

18. The method of claim 16, wherein the predictive relationship is provided to the user via a user device.

19. The method of claim 12, wherein identifying the predictive relationship further comprises using the degradation mapping statistical machine-learning process to calculate a statistically-suitable range of predicted values of biological extraction data over a range of time as a function of the first body degradation function and the second body degradation function.

20. The method of claim 12, wherein providing the body degradation packet to the user further comprises displaying the body degradation packet data via a user device.

21. The method of claim 12, wherein the computing device is designed and configured to:
receive updated user data, wherein updated user data is user data provided more recent in time than the first body degradation function was provided to the user;
calculate, using the body degradation machine-learning model and the updated user data, a numerical difference between a biological degradation rate and updated biological degradation rates from the updated user data; and
determine if a parameter in the updated user data resulted in a numerical difference between a predicted biological extraction parameter and the updated user data.

* * * * *